United States Patent
Wu et al.

(10) Patent No.: US 8,407,085 B1
(45) Date of Patent: Mar. 26, 2013

(54) THREE-DIMENSIONAL TAXONOMY SERVER FOR IDENTIFYING A LOCATION BASED ON A THREE-DIMENSIONAL POSITION OF A CLIENT DEVICE

(75) Inventors: Ping Wu, San Bruno, CA (US); Surojit Chatterjee, Fremont, CA (US); Paul Feng, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 534 days.

(21) Appl. No.: 12/650,765

(22) Filed: Dec. 31, 2009

(51) Int. Cl.
*G06Q 30/00* (2012.01)
(52) U.S. Cl. .................................. 705/14.1
(58) Field of Classification Search .............. 705/14.1
See application file for complete search history.

(56) References Cited

U.S. PATENT DOCUMENTS

2009/0300528 A1* 12/2009 Stambaugh .................. 715/764

* cited by examiner

*Primary Examiner* — Daniel Lastra
(74) *Attorney, Agent, or Firm* — Lerner, David, Littenberg, Krumholz & Mentlik, LLP (57) ABSTRACT

A three-dimensional taxonomy server is operative to identify the location of a client device based on three-dimensional positional information received from the client device. The three-dimensional positional information may include global positioning system coordinates, an Internet Protocol address, cellular network information, or any other type of three-dimensional positional information. The three-dimensional taxonomy server may operate in conjunction with another server, such as an advertising server or business search server, to deliver contextual content based on the location of the client device. The contextual content may include a targeted advertisement, a targeted search result, or other type of contextual content.

18 Claims, 7 Drawing Sheets

| Record Identifier 304 | Business Name 306 | Address Information 308 | Latitude 310 | Longitude 312 | Floor 314 | Detailed Information 316 |

| Record Identifier 320 | Business Name 322 | Address Information 324 | Latitude 326 | Longitude 328 | Elevation 330 | Detailed Information 332 |

| Record Identifier 336 | Business Name 338 | Address Information 340 | Latitude 342 | Longitude 344 | IP Address 346 | Detailed Information 348 |

THREE-DIMENSIONAL TAXONOMY SERVER FOR IDENTIFYING A LOCATION BASED ON A THREE-DIMENSIONAL POSITION OF A CLIENT DEVICE

BACKGROUND

1. Technical Field

This application relates to identifying a location using three-dimensional positional information and, in particular, to a three-dimensional taxonomy server that identifies the location based on a three-dimensional position of a client device.

2. Related Art

A client device, such as a cellular phone, personal display assistant, or other client device, may be able to identify its geographic location. For example, the client device may include a global positioning system ("GPS") module that provides two-dimensional positional information, such as latitude and longitude, of the client device. The client device may, in turn, provide this information to a server or other host device for identifying the location of the client device.

The server or other host device may use the two-dimensional positional information to generate context data for consumption by the client device. The context data may take the form of an on-line advertisement, targeted search result, or other type of contextual data. However, with the increased popularity of client devices and the increased distribution of GPS modules, client devices are appearing in areas where identifying the location of the client device can be problematic, such as in multi-story buildings or densely populated areas. In these problematic situations, identifying the location of the client device based on the two-dimensional positional information is insufficient.

SUMMARY

A system for identifying a location based on a three-dimensional position of a client device comprises a memory storage device that includes a three-dimensional taxonomy database. The three-dimensional database has a plurality of three-dimensional taxonomy records such that each three-dimensional taxonomy record specifies a corresponding location. Moreover, a selected one of the plurality of three-dimensional taxonomy records includes a three-dimensional taxonomy record identifier that identifies the at least one three-dimensional taxonomy record and three-dimensional geographic location information that identifies a geographic position of the location corresponding to the at least one three-dimensional taxonomy record.

The system also includes a processor operative to receive three-dimensional positional information from a client device that identifies a three-dimensional position of the client device, extract elevation information from the three-dimensional positional information that identifies the elevation of the client device, and identify the selected three-dimensional taxonomy record based on mapping the elevation information of the client device to the three-dimensional geographic location information of the selected three-dimensional taxonomy record. Furthermore, the processor may be further operative to output the three-dimensional taxonomy record identifier of the selected three-dimensional taxonomy record. Alternatively, or in addition, the processor may be further operative to output a data stream representative of a renderable display indicative of the location based on the extracted three-dimensional taxonomy record identifier.

In addition, in one implementation, the three-dimensional geographic location information may include global positioning system coordinates and at least one global positioning system coordinate of the global positioning system coordinates may be a coordinate indicative of elevation above sea level. Moreover, the processor may be further operative to translate the elevation information to translated elevation information comprising an elevation value indicative of the client device's elevation above sea level and map the elevation information to the three-dimensional geographic location information of the selected three-dimensional taxonomy record by mapping the translated elevation information to the at least one global positioning system coordinate.

In another implementation, the location identified by the three-dimensional taxonomy record may be a first location the three-dimensional geographic location information may comprise relative height information that identifies the height of the location relative to a second location. In this alternative implementation, the processor may be further operative to translate the elevation information to translated elevation information comprising a relative elevation value indicative of the client device's elevation relative to the second location, and map the elevation information to the three-dimensional geographic information of the selected three-dimensional taxonomy record by mapping the translated elevation information to the relative height information.

Moreover, in the preceding alternative implementation, the second location may be a building comprising a plurality of floors and the relative elevation value may indicate that the first location is located on a selected floor of the plurality of floors. In addition, the translated elevation information may indicate that the client device is located on the selected floor of the building, and the at least one three-dimensional taxonomy record may be identified when the relative elevation value is mapped to the relative height information.

In yet another implementation, the system may also include an advertising server operative to deliver a targeted advertisement. The advertising server may include a keyword-advertisement database having a plurality of advertisement records, wherein at least one of the advertisement records of the plurality of advertisement records represents the targeted advertisement. The advertising server may be further operative to identify the at least one advertisement record based on the extracted three-dimensional taxonomy record identifier, and to deliver the targeted advertisement to the client device based on the identified at least one advertisement record.

In a further implementation, the system may also include a business search server operative to deliver a search result comprising at least one business. The business search server may have a business-keyword database including a plurality of business records, wherein at least one business record of the plurality of business records represents the at least one business. The business search server may be further operative to identify the at least one business record based on the extracted three-dimensional taxonomy record identifier, and to deliver the search result comprising the at least one business to the client device based on the identified at least one business record.

A method for identifying a location based on a three-dimensional position of a client device may include establishing a three-dimensional taxonomy database, the database having a plurality of three-dimensional taxonomy records, each three-dimensional taxonomy record specifying a corresponding location. A selected one of the plurality of three-dimensional taxonomy records comprises a three-dimensional taxonomy record identifier that identifies the at least one three-dimensional taxonomy record, and three-dimensional geographic location information that identifies a geographic position of the location corresponding to the at least one three-dimensional taxonomy record.

The method further includes receiving three-dimensional positional information from a client device that identifies a three-dimensional position of the client device; extracting elevation information from the three-dimensional positional information that identifies the elevation of the client device; identifying the selected three-dimensional taxonomy record based on mapping the elevation information of the client device to the three-dimensional geographic location information of the selected three-dimensional taxonomy record; and, outputting the three-dimensional taxonomy record identifier of the selected three-dimensional taxonomy record. The method may also include outputting a data stream representative of a renderable display indicative of the location based on the extracted three-dimensional taxonomy record identifier.

In one implementation, the three-dimensional geographic location information may comprise global positioning system coordinates wherein at least one global positioning system coordinate of the global positioning system coordinates is a coordinate indicative of elevation above sea level. The method may further include translating the elevation information to translated elevation information comprising an elevation value indicative of the client device's elevation above sea level; and, mapping the elevation information to the three-dimensional geographic location information of the selected three-dimensional taxonomy record by mapping the translated elevation information to the at least one global positioning system coordinate.

In another implementation, the location identified by the three-dimensional taxonomy record may be a first location, and the three-dimensional geographic location information may comprise relative height information that identifies the height of the location relative to a second location. In this alternative implementation, the method may include translating the elevation information to translated elevation information comprising a relative elevation value indicative of the client device's elevation relative to the second location; and, mapping the elevation information to the three-dimensional geographic information of the selected three-dimensional taxonomy record by mapping the translated elevation information to the relative height information.

Further, based on the preceding implementation, the second location may be a building comprising a plurality of floors and the relative elevation value may indicate that the first location is located on a selected floor of the plurality of floors. Furthermore, the translated elevation information may indicate that the client device is located on the selected floor of the building, and that the at least one three-dimensional taxonomy record is identified when the relative elevation value is mapped to the relative height information.

In yet another implementation, the method may include establishing an advertising server operative to deliver a targeted advertisement. The advertising server may include a keyword-advertisement database having a plurality of advertisement records, wherein at least one of the plurality advertisement records of the plurality of advertisement records represents the targeted advertisement. Moreover, the method may include identifying the at least one advertisement record based on the extracted three-dimensional taxonomy record identifier; and, delivering the targeted advertisement to the client device based on the identified at least one advertisement record.

In a further implementation, the method may include establishing a business search server operative to deliver a search result comprising at least one business. The business search server may have a business-keyword database including a plurality of business records, wherein at least one of the business records of the plurality of business records represents the at least one business. In addition, the method may include identifying the at least one business record based on the extracted three-dimensional taxonomy record identifier; and, delivering the search result comprising the at least one business to the client device based on the identified at least one business record.

Aspects, features and advantages of the invention will be appreciated when considered with reference to the following description of preferred embodiments and accompanying figures. The same reference numbers in different drawings may identify the same or similar elements. Furthermore, the following description is not limiting; the scope of the invention is defined by the appended claims and equivalents.

DETAILED DESCRIPTION

Figure 1:
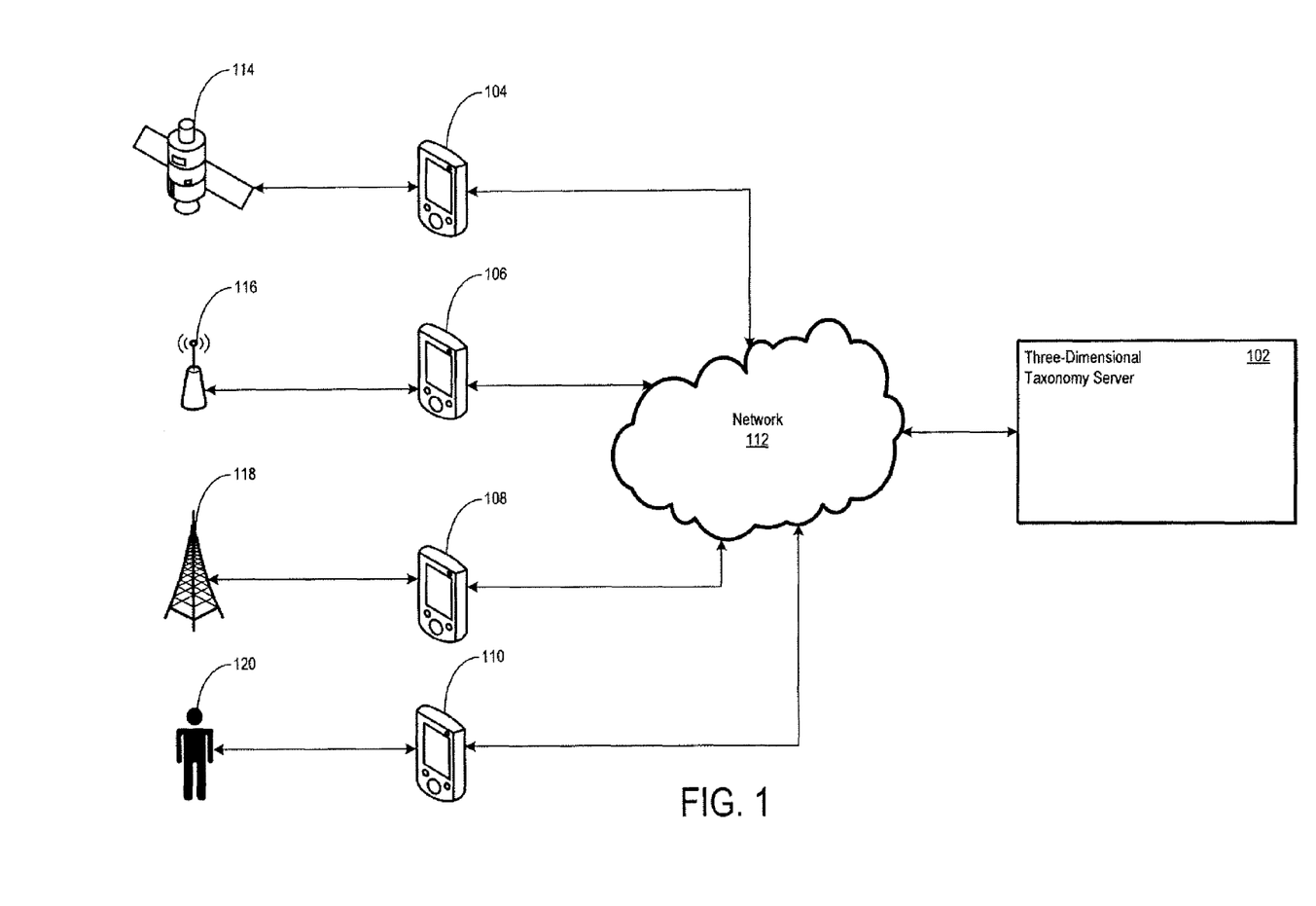
FIG. 1 illustrates one example of client devices in communication with a three-dimensional taxonomy server.

FIG. 1 shows one example of a three-dimensional taxonomy server 102 in communication with one or more client devices 104-110. The client devices 104-110 may be any type of client device, such as a cellular phone, personal display assistant, portable music player, laptop or desktop computer, or any other type of client device now known or later developed.

The client devices 104-110 communicate with the three-dimensional taxonomy server 102 through a network 112. The network 112 may be any type of network, such as a wireless network, a wired network, or a combination of wireless and wired networks. One example of a network is a Wide Area Network ("WAN"), such as the Internet. The Wide Area Network may include an information-sharing model for sharing information, such as the World Wide Web. Another example of a network is a Local Area Network ("LAN"). Other types of networks are also possible.

The network 112 may employ a variety of protocols for communicating information between the client devices 104-110 and the three-dimensional taxonomy server 102. For example, the network 112 may employ transmission protocols, such as the Transmission Control Protocol ("TCP"), packet-switched protocols, such as the Internet Protocol ("IP"), wireless protocols, such as 802.11b/g/n, Bluetooth, and WiMAX, voice communication protocols, such as the H.323 protocol, or any other protocol now known or later developed.

The client devices 104-110 are equipped to provide three-dimensional positional information to the three-dimensional taxonomy server 102. In one implementation, the client device 104 is equipped to receive GPS coordinates from one or more GPS satellites 114. For example, the client device 104 may receive GPS coordinates from four or more GPS satellites 114. The client device may also receive GPS coordinates from an alternative number of GPS satellites 114. The GPS coordinates may include a number of coordinates including a latitude coordinate, a longitude coordinate, an elevation coordinate or any other type of coordinate. The elevation coordinate may be based on a mathematical model representing the Earth's near-spherical surface. For example, the GPS module may determine the elevation coordinate based on a reference ellipsoid that approximates the Earth's surface. Alternatively, the GPS module may determine the elevation coordinate using orthometric height, which is generally considered the height above the geoid. The geoid may be determined by the Earth's gravity at the location of the client device 104 and approximated by mean sea level. The elevation coordinate based on the reference ellipsoid may be the same, or different from, the elevation coordinate approximated by mean sea level.

Alternatively, the client device 104 itself may determine the elevation coordinate or three-dimensional positional information. For example, the client device 104 may calculate speed and direction of movement to determine three-dimensional position information. The client device 104 may include one or more gyroscopes, accelerometers, altimeters, barometers, or other sensing devices, and, based on the measurements from those devices, the client device 104 may ascertain its own three-dimensional positional information. As one example, where the client device 104 is located in an elevator and moves in an upward direction for thirty seconds at a determinable speed, the client device 104 may be operative to calculate its elevation relative to its previous location, such as the ground floor of the elevator. Other mechanisms or devices for providing the elevation coordinate may also be in communication with the client device 104. In another implementation, the client device 106 is equipped to receive an IP address from a wired or wireless network 116, and the client device 106 may provide the IP address to the three-dimensional taxonomy server 102 as, or part of, the three-dimensional positional information. The IP address may be any type of network address, such as an IPv4 address, an IPv6 address, or a combination thereof. As discussed later below, the three-dimensional taxonomy server 102 may be configured to identify the location of the client device 106 based on the provided IP address, for instance by reverse geocoding.

In yet a third implementation, the client device 108 may be in communication with one or more cellular networks 118 and employ mobile positioning technology to provide the three-dimensional positional information to the three-dimensional taxonomy server 102. The mobile positioning technology may include measuring power levels and antenna patterns to determine the location of the client device 108.

More particularly, the client device 108 may employ, or rely on, one or more types of localization-based systems to assist three-dimensional taxonomy server 102 in determining the location of the client device 108. Examples of a localization-based system include, but are not limited to, a network-based localization system, a handset-based localization system, or a combination of network-based and handset-based localization systems. In general, a network-based localization system focuses on using a telecommunication service provider's network infrastructure to identify the location of the handset. In contrast, a handset-based localization system focuses on software installed, or hardware located, on the client device 108 to calculate the location of the client device 108 through cell identification, signal strengths of the home and neighboring cells, and/or latitude and longitude coordinates acquired by GPS technology. The calculated location may then be sent to the three-dimensional taxonomy server 102 as, or part of, the three-dimensional positional information. A hybrid-based localization system employs both network-based and handset-based techniques to calculate the location of the client device 108, such as Assisted GPS.

In yet another implementation, a client device 110 may receive the three-dimensional position information from a user 120. For example, the user 120 may input the local address to the client device 110 or the user 120 may input latitudinal coordinates, longitudinal coordinates, and elevation to the client device 110. In another example, the three-dimensional taxonomy server 102 may employ a feedback loop to collect and refine three-dimensional positional information or three-dimensional geographic information for a location. One example of using a feedback loop to refine three-dimensional positional information or three-dimensional geographic information is discussed with reference to FIGS. 6-7. In summary, the client device 110 may receive user input from a user 120 to provide the three-dimensional positional information to the three-dimensional taxonomy server 102.

Moreover, any one or combination of the above techniques may be used to provide three-dimensional positional information of a client device to the three-dimensional taxonomy server 102. For example, a client device 104 may initially acquire GPS coordinates from one or more GPS satellites 114 to form baseline or initial three-dimensional positional information. The baseline or initial three-dimensional positional information may then be supplemented, or augmented by, additional information acquired from local networks 116, cellular networks 118, and/or a user 120. For example, the user 120 may particularly define the elevation information of the three-dimensional positional information if the baseline or initial elevation information is incomplete, inaccurate, or missing. The user-provided elevation information may be absolute elevation information regarding the client device 104, such as the number of feet above sea level, or may be relative elevation information, such as the floor of a building where the client device 104 is located in a multi-story building. Other combinations of the techniques described above are also possible.

Figure 2:
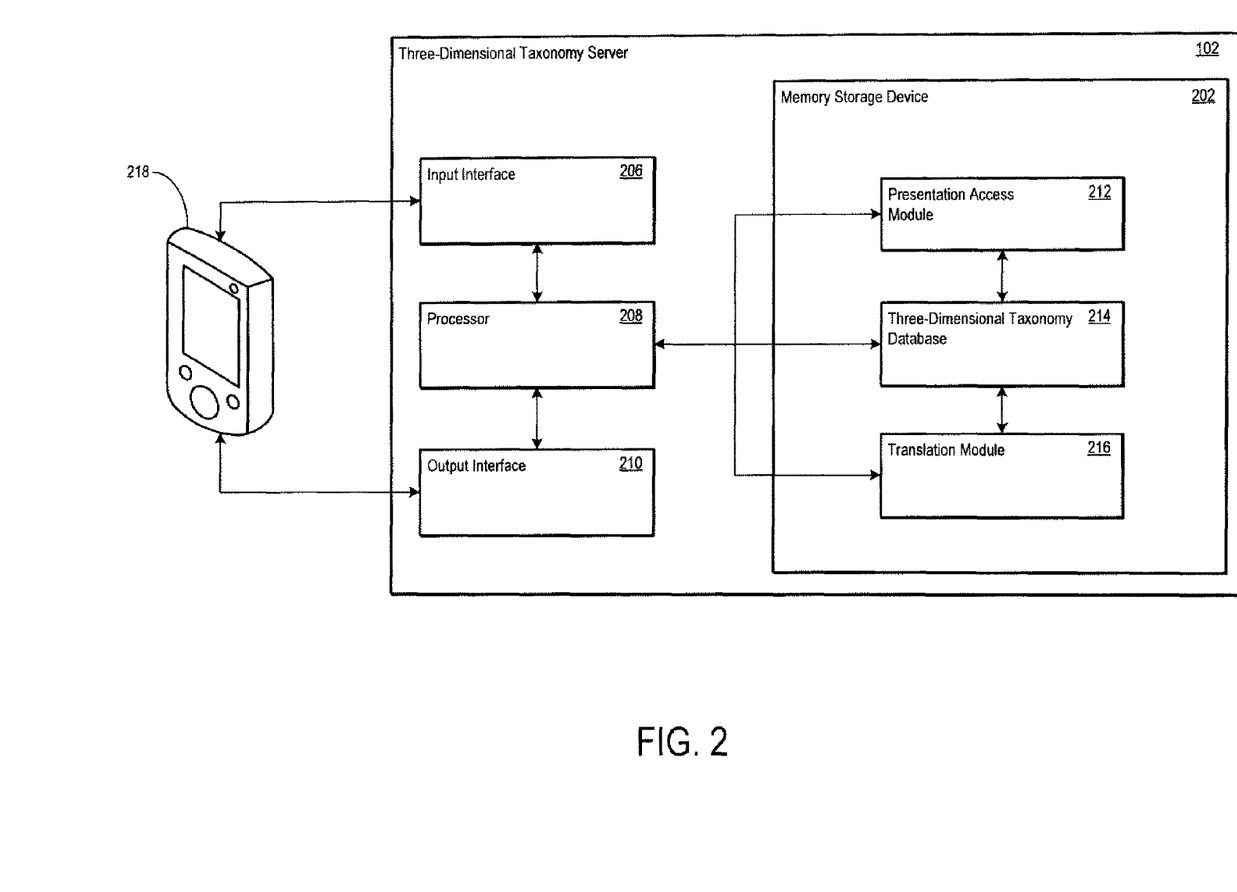
FIG. 2 illustrates one example of the three-dimensional taxonomy server illustrated in FIG. 1.

FIG. 2 illustrates one example of the three-dimensional taxonomy server 102 in communication with a client device 218. The client device 218 may be the same, or different from, one or more of the client devices 104-110 shown in FIG. 1. The three-dimensional taxonomy server 102 is operative to identify the location of the client device 218 based on the three-dimensional positional information received from the client device 218. In addition, the three-dimensional taxonomy server 102 may be further operative to add, modify, or remove location information previously stored in the three-dimensional taxonomy server 102.

In one implementation, the three-dimensional taxonomy server 102 includes a memory storage device 202, an input interface 206, a processor 208, and an output interface 210. The memory storage device 202 may be any type of memory storage device, such as a hard drive or Random Access Memory ("RAM"), or any other computer-readable medium now known or later developed. The input interface 206 may be any type of input interface, such as a Universal Serial Bus ("USB") interface, a serial interface, a parallel interface, a network interface (such as Ethernet), or any other type of input interface now known or later developed. The output interface 210 may be any type of output interface, such as a USB interface, a serial interface, a parallel interface, a High-Definition Multimedia Interface ("HDMI"), a Digital Visual Interface ("DVI"), a network interface, an optical fiber interface (such as TOSLINK), or any other output interface now known or later developed.

The processor 208 may be any type of processor, such as a hardware processor, a software processor, or a combination. The processor 208 communicates inputs received from the input interface 206 to the memory storage device 202. Similarly, the processor 208 communicates outputs from the memory storage device 202 to the output interface 210. In addition, the processor 208 may facilitate the manipulation of data provided to or received from one or more of the modules and database residing in the memory storage device 202.

In one implementation, the memory storage device 202 includes a presentation access module 212, a three-dimensional taxonomy database 214, and a translation module 216. The presentation access module 212, the three-dimensional taxonomy database 214, and/or the translation module 216 may be implemented in software, hardware, or a combination thereof. As examples of software, the presentation access module 212, the three-dimensional taxonomy database 214, and/or the translation module 216 may be implemented in a computer programming language, such as C, C++, C#, Java or other computer programming language now known or later developed. As examples of hardware, one or more of the presentation access module 212, the three-dimensional database 214, and/or translation module 216 may be implemented as a separate processor or as a separate computer in communication with the three-dimensional taxonomy server 102.

The presentation module 212 facilitates the input and output of data to the three-dimensional taxonomy database 214. In one implementation, the presentation module 212 receives three-dimensional positional information from the client device 218 that identifies the three-dimensional position of the client device. As discussed above, the presentation access module 212 may receive the three-dimensional positional information via the processor 208 through the input interface 206. The three-dimensional positional information from the client device 218 may then be used as input to the three-dimensional taxonomy database 214 to determine the location of the client device 218. Moreover, the three-dimensional positional information from the client device 218 may be used to update or modify the information stored by the three-dimensional taxonomy database 214.

The three-dimensional taxonomy database 214 is operative to store three-dimensional geographic location information about one or more locations. The three-dimensional geographic location information may describe the geographic location of a location, such as a business, retailer, point of interest, or other location. Similar to the three-dimensional positional information, the three-dimensional geographic location information may include global positioning system coordinates, one or more IP addresses, cellular network information, and/or previously-provided user input about a location. As discussed with reference to FIGS. 3A and 3B, the three-dimensional taxonomy database 214 may store the three-dimensional geographic location information in one or more three-dimensional taxonomy records.

Figure 3A:
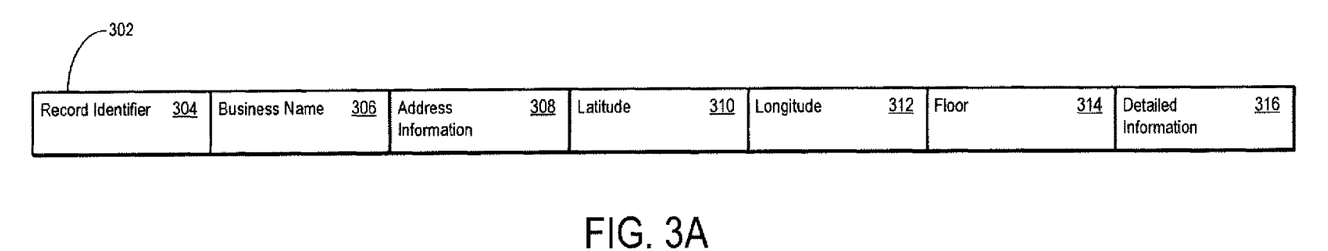
FIG. 3A. illustrates one example of a three-dimensional taxonomy record.

FIG. 3A shows one example of a three-dimensional taxonomy record 302 that specifies a corresponding location. The three-dimensional taxonomy record 302 may include one or more three-dimensional taxonomy record fields 304-316 for specifying the corresponding location.

In one implementation, the three-dimensional taxonomy record 302 includes a three-dimensional taxonomy record identifier field 304, a business name field 306, an address information field 308, a latitude field 310, a longitude field 312, a floor field 314, and a detailed information field 316.

Figure 3B:
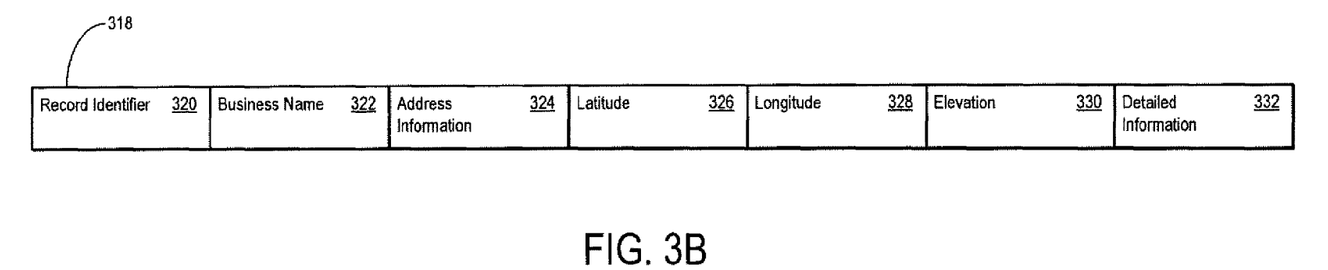
FIG. 3B. illustrates another example of a three-dimensional taxonomy record.
Figure 3C:
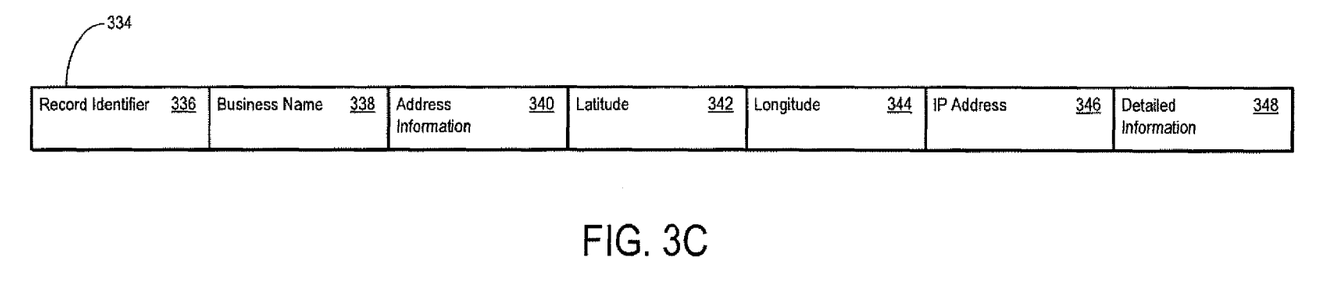
FIG. 3C. illustrates a further example of a three-dimensional taxonomy record.

Alternative or additional three-dimensional taxonomy record fields may also be possible for a three-dimensional taxonomy record. For example, FIG. 3B shows another example of a three-dimensional taxonomy record 318 that specifies a corresponding location. The three-dimensional taxonomy record 318 includes a three-dimensional taxonomy record identifier field 320, a business name field 322, an address information field 324, a latitude field 326, a longitude field 328, an elevation field 330, and a detailed information field 332. As another example, FIG. 3C shows a third example of a three-dimensional taxonomy record 334 that includes a three-dimensional taxonomy record identifier field 336, a business name field 338, an address information field 340, a latitude field 342, a longitude field 344, an IP address field 346, and a detailed information field 348.

Table 1 below explains the data stored by each of the three-dimensional taxonomy record fields 304-316 and/or three-dimensional taxonomy record fields 320-332.

TABLE 1

| Three-dimensional Taxonomy Record Field | Brief Explanation |
|---|---|
| Record Identifier | A unique alphanumeric identifier that identifies the three-dimensional taxonomy record. |
| Business Name | Identifies the business or point of interest name for the location corresponding to the three-dimensional taxonomy record. |
| Address Information | Identifies the address for the business or the point of interest. |
| Latitude | Identifies the latitude for the business or the point of interest. The specificity of the latitude may vary according to business or point of interest. |
| Longitude | Identifies the longitude for the business or the point of interest. The specificity of the longitude may vary according to the business or point of interest. |
| Floor | Identifies the floor of a building on which the business or point of interest resides. The floor three-dimensional taxonomy record field may be populated according to whether the business or point of interest resides on a floor of a building. |
| Elevation | Identifies the elevation of the business or point of interest. The elevation field may or not be populated. The elevation field may be approximate elevation, elevation above sea level, or any other type of elevation. |

TABLE 1-continued

| Three-dimensional Taxonomy Record Field | Brief Explanation |
|---|---|
| | As discussed previously, one or more mathematical techniques may be used to approximate the elevation of the location corresponding to the three-dimensional taxonomy record. |
| IP Address | Identifies the IP address of the business or point of interest. The IP address field may or not be populated. The IP address field may be a specific IP address for the business or point of interest, a general subnet address, or any other type of address. |
| Detailed Information | Populated with varying information, such as editorial commentary, user reviews, descriptive information, or other information. The detailed information three-dimensional taxonomy record field may also point to another record, table, or database for additional information regarding the location corresponding to the three-dimensional taxonomy record. |

The first example of a three-dimensional taxonomy record 302, the second example of a three-dimensional taxonomy record 318, and/or the third example of a three-dimensional taxonomy record 334 may be configured to store different components of three-dimensional geographic location information for a corresponding location. For example, the three-dimensional taxonomy record 302 is configured to store relative height information as part of the three-dimensional geographic location information. The relative height information may identify the height of the location identified by the three-dimensional taxonomy record 302 relative to a second location, such as a building. For example, the location may be a business operated on a selected floor of a multi-story or multi-floor building, such as the third floor of the building, and the relative height information may identify that the business is located on the third floor of the building. As briefly described in Table 1 above, the floor three-dimensional taxonomy record field 314 is configured to store this relative height information.

In other implementation, the three-dimensional taxonomy may store a floor plan or floor map of the building in which the location is located. The floor plan or floor map may be stored in a separate field of the three-dimensional taxonomy record or as part of another field, such as the detailed information three-dimensional taxonomy record field 316/332/348. The floor plan or floor map may be referenced in determining or ascertaining the floor on which the location is located. For example, an address may be used to identify the building in which the location is located, and then the floor plan or floor map may then be further referenced to more accurately determine the interior position of the location.

As a different example to storing relative height information, a three-dimensional taxonomy record may store absolute or approximated elevation. The three-dimensional taxonomy record 318 is configured to store elevation information as part of the three-dimensional geographic location information. As previously discussed above, the elevation information may be based on a mathematical model representing the Earth's near-spherical surface. For example, the elevation information may be based on a reference ellipsoid that approximates the Earth's surface. Alternatively, the elevation information may be determined by the Earth's gravity at the geographic location of the business or point of interest, and approximated by mean sea level. The elevation information based on the reference ellipsoid may be the same, or different from, the elevation information approximated by mean sea level.

As yet another example to storing relative height information, a three-dimensional taxonomy record may store an IP address associated with the business or point of interest, such as an IP address assigned by an Internet Service Provider ("ISP") or an IP address of the subnet on which the business or point of interest resides. The IP address may be any type of network address, such as an IPv4 address, an IPv6 address, or a combination thereof. The three-dimensional taxonomy record 334 is configured to store the IP address in the IP address three-dimensional taxonomy record field 346 as part of the three-dimensional geographic location information.

Moreover, a three-dimensional taxonomy record may include relative information, approximated or absolute elevation information, or IP address information. For example, a three-dimensional taxonomy record may include any combination of the data fields shown in FIGS. 3A-3C and, more particularly, any combination of the floor three-dimensional taxonomy record field 314, elevation three-dimensional taxonomy record field 330, and IP address three-dimensional taxonomy record field 346.

Turning back to FIG. 2, the three-dimensional taxonomy server 102 includes a translation module 216 operative to translate elevation information received from the client device 218 based on the data fields of the three-dimensional taxonomy records stored in the three-dimensional taxonomy database 214. For example, when three-dimensional taxonomy server 102 initially receives three-dimensional positional information from the client device 218, the processor 208 may extract elevation information from the three-dimensional positional information. Depending on the components of the three-dimensional positional information transmitted by the client device 218, the elevation information may include relative elevation information, approximated elevation information, one or more IP addresses, cellular network information, or any other components.

In one implementation, the translation module 216 translates the approximated elevation information of the client device 218 to a relative elevation value for the location of the client device 218. For example, the latitude and longitude of the client device 218 may correspond to one or more three-dimensional taxonomy records that indicate that the client device 218 is located in a multi-story building. Based on the determination that the client device 218 is located in a multi-story building, the translation module 216 may translate the elevation information by approximating the distances between businesses located in the multi-story building, and then converting the approximated elevation information to an elevation value indicative of the client device's elevation relative to the multi-story building.

Alternatively, the detailed information field of the three-dimensional taxonomy record corresponding to the longitude and latitude of the client device 208 may indicate that the multi-story building uses a predetermined distance between floors. Based on the predetermined distance between floors, the translation module 216 may convert the approximated elevation information to relative elevation value indicative of the client device's 208 location within the multi-story building.

Accordingly, the translated elevation information may indicate that the client device 218 is located on the fourth floor of the multi-story building. The processor 208 may then use the translated elevation information to further identify a three-dimensional taxonomy record that corresponds to the location of the client device 218.

In another implementation, the translation module 216 translates the elevation information received from the client device 218 to an elevation value stored in a three-dimensional taxonomy record. For example, the three-dimensional positional information may indicate that the client device 218 is located at latitude and longitude corresponding to a multi-story building, but the three-dimensional geographic location information stored in the three-dimensional taxonomy record of the multi-story building indicates that a different mathematical model was used to determine the elevation of the client device 218. Based on the differences between the mathematical model used to determine the elevation of the location and the mathematical model used to determine the elevation of the client device 218, the translation module 216 then translates the elevation information of the client device 218 to an elevation value commensurate with the mathematical model used to determine the elevation of the location. Based on the translated elevation value, the processor 208 may then identify the three-dimensional taxonomy record corresponding to three-dimensional positional information and the translated elevation information.

Following is a description of adding a new location to the three-dimensional taxonomy database 214. While the description below describes adding a new location, the three-dimensional taxonomy server 102 may further permit modifications to the three-dimensional taxonomy records. Modifications may include modifications to the three-dimensional taxonomy records or the data fields of the three-dimensional taxonomy records. Examples of modifications include additions, deletions, edits, revisions, removals, or any other type of modifications.

In one implementation, a user provides three-dimensional geographic location information to the three-dimensional taxonomy server 102 for a location via the client device 218. For example, the presentation access module 212 may output a display for receiving input from the client device 218. The display may be a form formatted based on the Hypertext Extensible Markup Language ("HTML") and may have one or more form fields for receiving input from the user of the client device 218. The form fields may correspond to one or more of the three-dimensional taxonomy record fields for a three-dimensional taxonomy record. The user may input data, such as a name for the location/business/point of interest, an address, a longitude, a latitude, an elevation or relative elevation, or other data, into one or more of the form fields using the client device 218.

Alternatively, the data for the three-dimensional taxonomy record may be automatically provided by the client device 218. For example, when the client device 218 communicates with the three-dimensional taxonomy server 102, the client device 218 may automatically provide selected three-dimensional geographic location information, such as latitude, longitude, approximated elevation or relative elevation, an IP address, or other selected three-dimensional geographic location information. Moreover, the selected three-dimensional geographic location information may be provided along with user-provided three-dimensional geographic location information.

In yet another implementation, the presentation access module 212 may output a graphical user interface displaying the environment near the client device 218. The graphical user interface may be rendered as a two-dimensional environment, a three-dimensional environment, or a combination of two- and three-dimensions.

When representing the environment in two dimensions, the graphical user interface may include menu elements, such as buttons, drawing tools, clickable form fields, or other elements that assist the user in annotating or otherwise describing a location represented in the two-dimensional environment. For example, similar to the aforementioned form displayed as an HTML file, the graphical user interface may display predetermined elements that correspond to one or more of the three-dimensional taxonomy record fields. By selecting or manipulating the predetermined elements, the user or the client device 218 may provide three-dimensional geographic location information about the location where the client device 218 is located. In one scenario, this may be done via an augmented reality application.

Furthermore, when representing the environment in three dimensions, and in addition to displaying features shown in the two-dimensional graphical user interface, the graphical user interface may display a graphical environment that approximates the environment where the client device 218 is located. Moreover, the three-dimensional graphical user interface may represent the user or the client device 218 with an avatar, that is, a three-dimensional representation, within the three-dimensional environment. The graphical user interface may permit the user or the client device 218 to manipulate the avatar so as to move the avatar about the three-dimensional environment. Using the avatar, the user or the client device 218 may then annotate or manipulate images shown in the three-dimensional environment to populate one or more three-dimensional taxonomy record fields for a three-dimensional taxonomy record.

Although the graphical user interface may display a two- or three-dimensional environment of where the client device 218 is located, the graphical user interface may also allow the user or the client device 218 to display a different environment other than where the client device 218 is located. Hence, the user or the client device 218 may modify or add a three-dimensional taxonomy record for a location other than the location of the user or the client device 218.

Moreover, while the description above references the presentation access module 212 as displaying the HTML file and/or the two-dimensional/three-dimensional environment, the three-dimensional taxonomy server 102 may operate in conjunction with another server or computer that outputs the display to the user or client device 218. For example, the presentation access module 212 may facilitate access to the three-dimensional taxonomy database 214 between the three-dimensional taxonomy server 102 and the other server or computer. Hence, the three-dimensional taxonomy server 102 may be able to operate in unison with different types of servers and/or computers that are operative to display different types of graphical user interfaces to the user or the client device 218.

Figure 4:
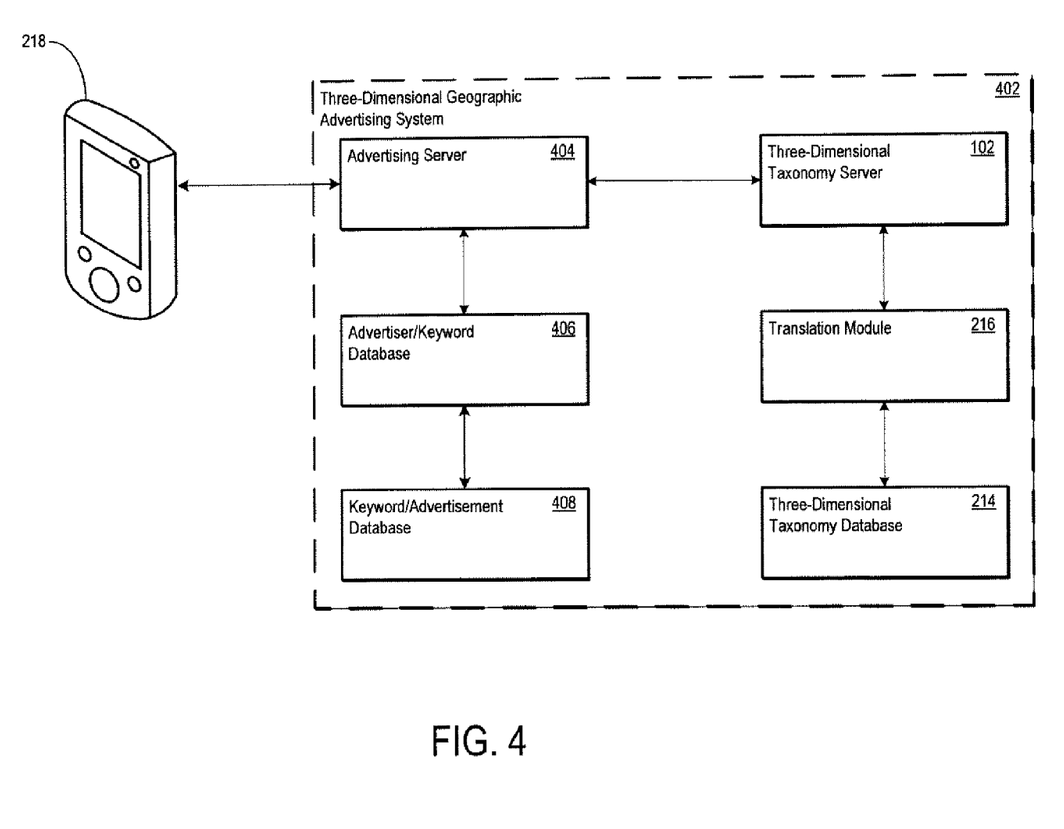
FIG. 4 illustrates one example of a three-dimensional geographic advertising system in communication with a client device.

Turning next to FIG. 4 is an illustration of one example of a three-dimensional geographic advertising system 402 in communication with the client device 218. The three-dimensional geographic advertising system 402 includes the three-dimensional taxonomy server 102 and an advertising server 404. The three-dimensional geographic advertising system 402 is operative to deliver a targeted advertisement to the client device 218 based on the three-dimensional positional information transmitted by the client device 218.

To deliver targeted advertisements to the client device 218, in one implementation, the advertising server 404 may include, or be in communication an advertiser/keyword database 406 and a keyword/advertisement database 408.

In one implementation, the advertiser/keyword database 406 associates keywords with advertisers. For example, the advertiser/keyword database 406 may include one or more advertiser records that associate a particular advertiser, or type of advertiser, with one or more keywords. An advertiser record may identify the particular advertiser "Kentucky Fried Chicken" and associate this particular advertiser with the keywords "chicken," "fast food," "restaurant," or any other keyword. Alternatively, an advertiser record may identify a "fast food restaurant" as a type of advertiser and associate the "fast food restaurant" with the keywords "chicken," "burger," "fast food," "restaurant," or any other keyword. The advertiser/keyword database 406 may also include a combination of advertiser-specific advertiser records and advertiser-type advertiser records.

In one implementation, the keyword/advertisement database 408 associates keywords with advertisements. The keyword/advertisement database 408 may include one or more advertisement records that associate one or more keywords with the advertisements. Each of the keywords associated with the advertisement may be selected based on their commonality with the advertisement. For example, the keyword/advertisement database 408 may include an advertisement record for a restaurant advertisement associated with the keywords "restaurant," "eatery," "chicken," "burger," or any other keyword. As another example, the keyword/advertisement database 408 may include an advertisement record for a razor advertisement associated with the keywords "razor," "shaving," "facial hair," or any other keyword. Alternative or additional types of advertisement records are also possible.

The advertisement referenced, or stored, by advertisement record may be any type of advertisement, such as a textual advertisement, a graphical advertisement, or a combination thereof. A textual advertisement may include only text, a graphical advertisement may include only graphics, and a textual-graphical advertisement may include both graphics and text. The advertising server 404 may be configured to deliver the advertisement referenced, or stored, by the advertisement record as the targeted advertisement to the client device 218.

Figure 5:
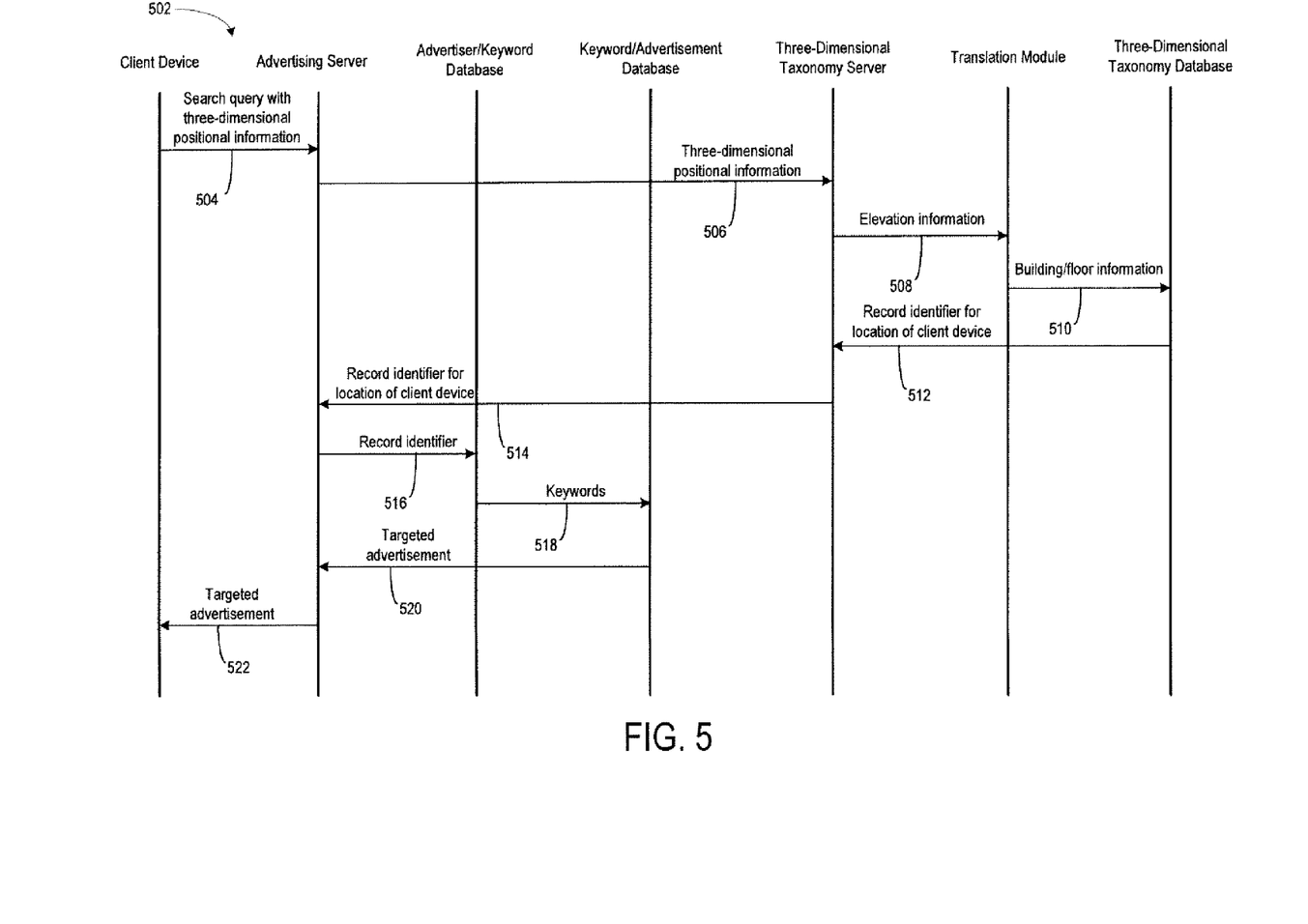
FIG. 5 illustrates one example of message flow for the three-dimensional geographic advertising system of FIG. 4.

FIG. 5 illustrates one example of message flow 502 for the three-dimensional geographic advertising system 402. A client device 218 may transmit a search query and the search query, or a portion thereof, may be transmitted to the advertising server 404 (504). The advertising server 404 may parse the search query to identify three-dimensional positional information embedded within, or transmitted with, the search query. Alternatively, the advertising server 404 may transmit a request for the three-dimensional positional information to the client device 218 in response to receiving the search query or other query.

The three-dimensional taxonomy server 102 may then receive the three-dimensional positional information from the client device 218 via the advertising server 404 (506). When the three-dimensional positional information is received, the processor 208, the presentation access module 212, or other component of the three-dimensional taxonomy server 102 may extract elevation information from the three-dimensional positional information. Depending on the elevation information extracted from the three-dimensional positional information, the translation module 216 may translate the elevation information (508). For example, the translation module 216 may translate the elevation information to an elevation value indicative of the client device's 218 elevation above sea level, such as an elevation value of 1,000 feet above sea level. Alternatively, the translation module 216 may translate the elevation information to a relative elevation value indicative of the client device's 218 elevation relative to a building, such as a relative elevation value of being on the seventh floor of a building having twenty-one floors.

After performing a translation, the translation module 216 may then transmit the translated elevation to the processor 208, or other component, for selecting a three-dimensional taxonomy record from the three-dimensional taxonomy database 214. The processor 208, or other component, may identify a three-dimensional taxonomy record corresponding to the location of the client device 218 based on mapping the elevation information of the client device 218 to the three-dimensional geographic location information of a three-dimensional taxonomy record (510). For example, the processor 208 may map the three-dimensional positional information, including the elevation information whether translated or not, to one or more fields of a three-dimensional taxonomy record.

Mapping the three-dimensional positional information may include comparing values of the three-dimensional positional information, include the elevation information or translated elevation information, with values stored by one or more fields of a three-dimensional taxonomy record. In one implementation, the three-dimensional positional information is mapped to the latitude three-dimensional taxonomy record field 310, the longitude three-dimensional taxonomy record field 312, and the floor three-dimensional taxonomy record field 314. Other mappings involving other fields, such as the elevation three-dimensional taxonomy record field 330, the IP address three-dimensional taxonomy record field 346, the address information three-dimensional taxonomy record field 308/324/340 are also possible.

In mapping the three-dimensional positional information, the three-dimensional taxonomy server 102 may employ a margin of error to account for slight differences between the three-dimensional positional information and the values stored by one or more fields of a three-dimensional taxonomy record. Alternatively, a field of a three-dimensional taxonomy record may include a range of values, and the three-dimensional taxonomy record may be selected when the three-dimensional positional information is contained within the range of the values stored in the three-dimensional taxonomy record field.

When the three-dimensional taxonomy server 102 has identified a three-dimensional taxonomy record having values equal to, similar to, or enclosing the three-dimensional positional information, the three-dimensional taxonomy server 102 may extract the record identifier 304/320/336 of the three-dimensional taxonomy record (512). The record identifier 304/320/336 may then be transmitted to the advertising server 404 (514).

The advertising server 404 may then deliver a targeted advertisement to the client device 218 based on the received record identifier 304/320/336. The advertising server 404 may first use the record identifier 304/320/336 to select an advertiser record from the advertiser/keyword database 406 (516). For example, an advertiser record may have an advertiser record field containing a value similar, or equal, to the record identifier 304/320/336. From the advertiser record, the advertising server 404 may extract one or more keywords associated with the advertiser identified by the record identifier 304/320/336.

After extracting one or more keywords from the selected advertiser record, these keywords may be passed to the keyword/advertisement database 408 to select one or more advertisements from the keyword/advertisement database 408 (518). The advertising server 404 may identify one or more advertising records as being associated with the selected keywords (520).

The advertisements associated with the advertising records may be selected as targeted advertisements for delivery to the client device 218 (522). Alternatively, the advertising server 404 may use a refinement scheme to further identify an advertisement to deliver as a targeted advertisement. In one implementation, an advertiser may influence when a targeted advertisement is displayed. For example, where an advertiser has paid to be considered as a higher priority, the advertising server 404 may select the advertisement of the paying advertiser as the targeted advertisement. In another example, an advertiser may arrange to have an advertisement displayed as a targeted advertisement for a particular floor or range of floors. For example, an advertisement stored on the advertising server 404 may indicate that it should be displayed when the client device 218 is on the fourth floor or when the client device 218 is on the first through fifth floors.

In another implementation, the advertising server 404 may select an advertisement in accordance with the direction of movement of the client device 218. For example, the client device 218 may relay whether it is moving in an upwardly or downwardly direction, such as when the client device 218 is in an elevator. Based on the upward or downward direction of the client device 218, the advertising server 404 may select an advertisement associated with a location or business on a floor that is on a floor higher or lower than the client device 218, depending on the upward or downward direction of the client device 218. Other refinement schemes are also possible.

Figure 6:
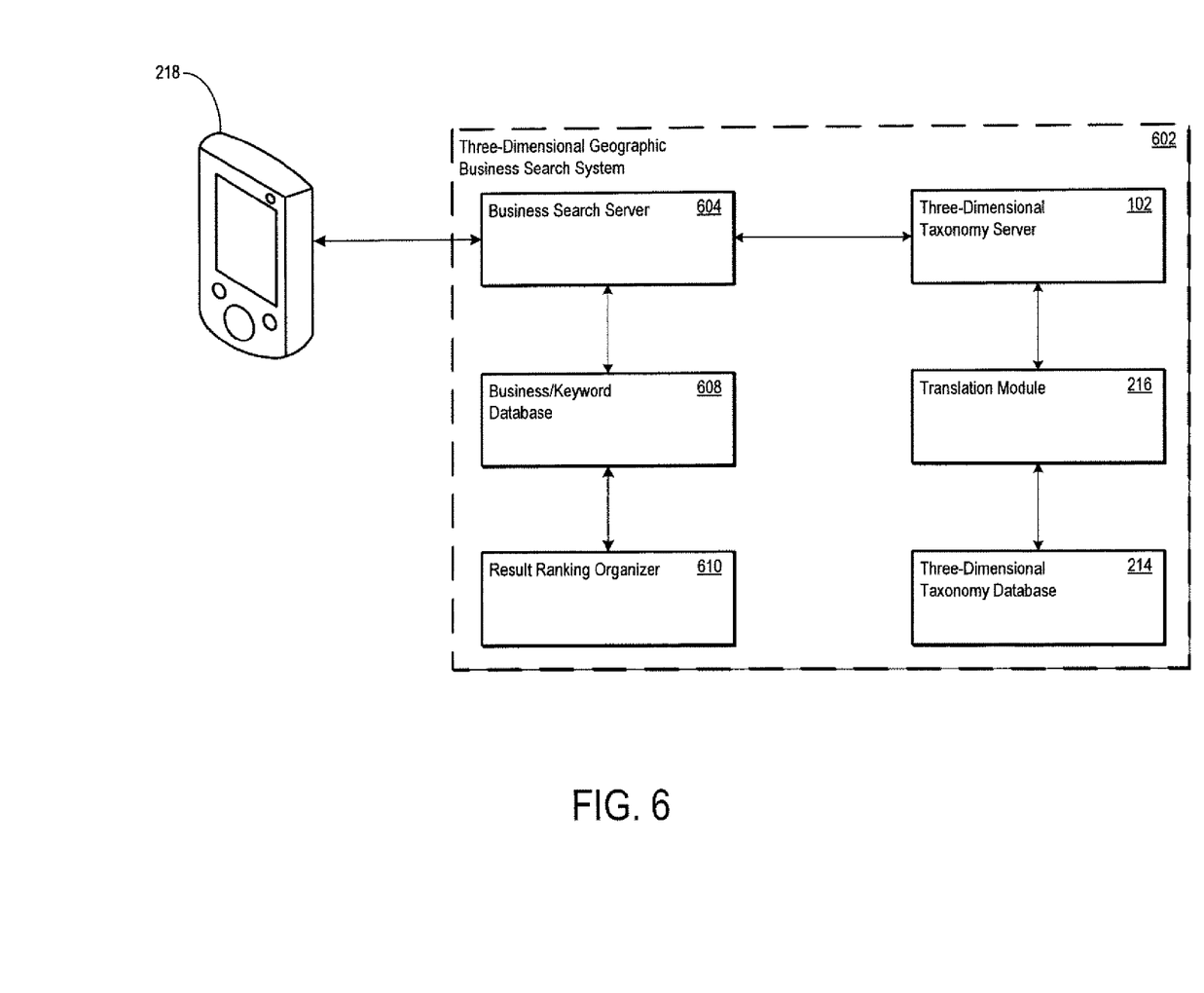
FIG. 6 illustrates one example of a three-dimensional geographic business search system in communication with a client device.

Turning next to FIG. 6 is an illustration of one example of a three-dimensional geographic business search system 602 in communication with the client device 218. The three-dimensional geographic business search system 602 includes the three-dimensional taxonomy server 102 and a business search server 604. The three-dimensional geographic business search system 602 is operative to deliver a targeted search result including at least one business to the client device 218 based on the three-dimensional positional information transmitted by the client device 218.

To deliver a targeted search result to the client device 218, in one implementation, the business search server 604 may include, or be in communication a business/keyword database 608 and a result ranking organizer 610.

In one implementation, the business/keyword database 608 associates keywords with businesses. For example, the business/keyword database 608 may include one or more business records that associate a particular business, or type of business, with one or more keywords. An business record may identify the particular business "Kentucky Fried Chicken" and associate this particular business with the keywords "chicken," "fast food," "restaurant," or any other keyword. Alternatively, a business record may identify a "fast food restaurant" as a type of business and associate the "fast food restaurant" with the keywords "chicken," "burger," "fast food," "restaurant," or any other keyword. The business/keyword database 608 may also include a combination of business-specific business records and business-type business records.

In one implementation, the result ranking organizer 610 facilitates the organization and ranking of search results. The result ranking organizer 610 may include a mechanism for ranking a set of search results based on a previously determined set of criteria, such as a proximity to a location, whether one of the businesses listed within the search results has paid for a higher position in the search results, whether a business is more relevant to the initial search query that generated the set of search results, or other criteria.

Figure 7:
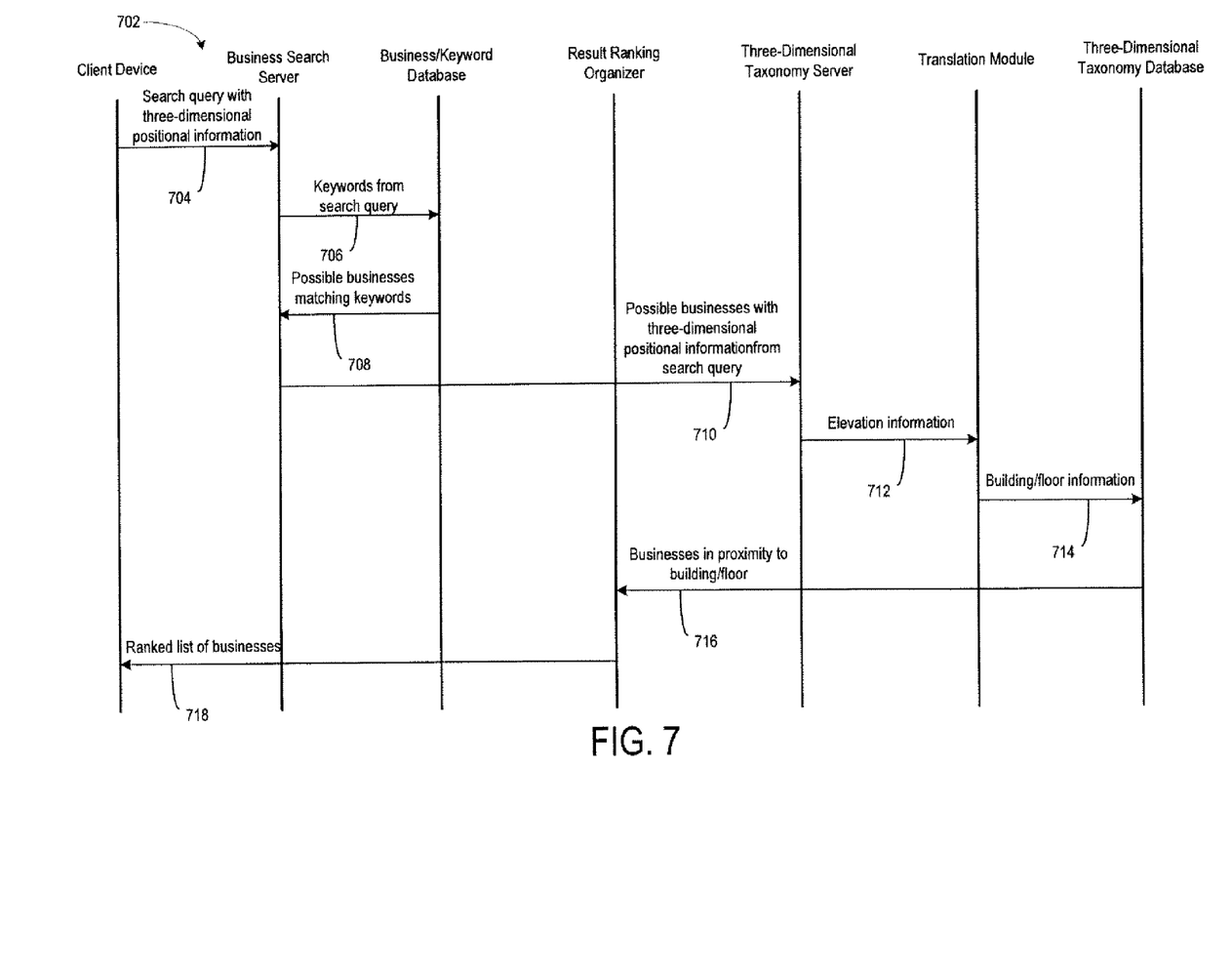
FIG. 7 illustrates one example of message flow for the three-dimensional geographic business search system of FIG. 6.

FIG. 7 illustrates one example of message flow 702 for the three-dimensional geographic business search system 602. A client device 218 may transmit a search query and the search query, or a portion thereof, may be transmitted to the business search server 604 (704). The business search server 604 may parse the search query to identify three-dimensional positional information embedded within, or transmitted with, the search query. Alternatively, the advertising server 604 may transmit a request for the three-dimensional positional information to the client device 218 in response to receiving the search query or other query.

The business search server 604 may then extract one or more keywords from the search query to pass to the business/keyword database 608 (706). After extracting one or more keywords from the search query, these keywords may be passed to the business/keyword database 608 to select one or more business from the business/keyword database 608. The business search server 604 may identify one or more business records as being associated with the extracted keywords (708).

The three-dimensional taxonomy server 102 may then receive the three-dimensional positional information from the client device 218 via the business search server 604 (710). As previously discussed with reference to FIG. 5, when the three-dimensional positional information is received, the three-dimensional taxonomy server 102 may extract elevation information from the three-dimensional positional information. (712). Depending on the elevation information extracted from the three-dimensional positional information, the translation module 216 may translate the elevation information.

After obtaining translated elevation information (if applicable), the translation module 216 may then transmit the translated elevation to the processor 208, or other component, for selecting one or more three-dimensional taxonomy records from the three-dimensional taxonomy database 214 (714).

In selecting the one or more three-dimensional taxonomy records from the three-dimensional taxonomy database 214, the three-dimensional taxonomy server 102 may use a range of values from the three-dimensional positional information. The three-dimensional taxonomy server 102 may be configured with one or more range values, such as a latitude range value, a longitude range value, an elevation range value, or other range values. The range values indicate the margin of error to use in selecting one or more three-dimensional taxonomy records. For example, an elevation range value of "15 feet" may indicate that the three-dimensional taxonomy server 102 is to select three-dimensional taxonomy records whose elevation values fall within a range of +/−15 feet of the elevation information from the three-dimensional positional information. Hence, the range values facilitate the selection of three-dimensional taxonomy records corresponding to locations that are in proximity to the location of the client device 218.

After selecting the three-dimensional taxonomy records corresponding to locations in proximity to the location of the client device 218, the three-dimensional taxonomy server 102 may then refine the list of selected three-dimensional taxonomy records based on the business previously selected from the business/keyword database 608. For example, the three-dimensional taxonomy server 102 may select three-dimensional taxonomy records whose corresponding locations are analogous, or similar, to the businesses selected from the business/keyword database 608. Alternatively, the three-dimensional taxonomy server 102 may use the businesses selected from the business/keyword database 608 in conjunction with the three-dimensional positional information to select the three-dimensional taxonomy records from the three-dimensional taxonomy record database 214.

The three-dimensional taxonomy server 102 then communicates the selected three-dimensional taxonomy records to the result ranking organizer 610 (716). The result ranking organizer 610 then engages in a ranking of the locations corresponding to the three-dimensional taxonomy records. As previously discussed, the result ranking organizer 610 may be configured with a set of criteria for ranking the locations. In one implementation, the locations are ranked according to proximity of the location of the client device 218. A proximity-based criterion may include proximity based on distance, wherein the distance is measured from the point of the client device 218 to the location. Distance-based proximity may or may not account for convenience. A distance-based proximity that accounts for convenience may include applying a weighting factor to the distance of a location that is located on the same floor as the client device 218. With the weighting factor, a first location located on the same floor of the client device 218 may rank higher than a second location that is on a floor above the client device 218, even if the distance between the client device 218 and the second location is less than the distance between the client device 218 and the first location. Similarly, with reference to the aforementioned example, a distance-based proximity criterion that does not account for convenience may indicate that the second location is, in fact, closer to the client device 218 than the first location.

Other types of ranking criterion are also possible. For example, in another implementation, the result ranking organizer 610 ranks the locations according to whether a business has paid to be ranked higher than other businesses. In yet a further implementation, the locations are ranked according to whether the location is related to the keywords from the initial search query transmitted by the client device 218.

Moreover, the result ranking organizer 610 may employ multiple criteria to rank the list of locations. For example the result ranking organizer 610 may first rank the locations according to proximity to the location of the client device 218, and then a further ranking according to whether a location is related to, or relevant for, the keywords of the initial query. Other types of ranking criteria are also possible. The result ranking organizer 610 then transmits the ranked list of locations to the client device 218 via the business search server 604 (718). In transmitting the ranked list of locations, the business search server 604 may incorporate the ranked list of locations into a search result transmitted to the client device 218 in response to the initial search query from the client device 218. In an alternative implementation, the ranked list of locations is transmitted as the search result to the client device 218. Other schemes for transmitting the ranked list of locations to the client device 218 are also possible.

In providing a search result of ranked or unranked locations, the business search server 604 may employ a feedback loop to further refine the search results transmitted to the client device 218. For example, the business search server 604 may transmit a request for the user or the client device 218 to input a floor number on each search result page. The request transmitted to the client device 218 may include an interface having a selectable element associated with one or more floor numbers, such as one or more drop-down boxes or one or more radio buttons, along with a textual, graphical, or similar statement that reads "To provide a better search result, we want to know which floor you are currently on." The user or the client device 218 may then use one or more selectable elements to select the floor on which the user or client device 218 is located. Other forms of feedback loops, such as click-monitoring, e.g., detecting which search result is selected more frequently, or requests for additional searches, are also possible.

The systems, components, and logic described above may be implemented in many different ways, including a combination of hardware and software, or as software for installation on any desired operating system including Linux, UNIX, or Windows. The functionality may be implemented in a single system or functionally partitioned across multiple systems. As another example, the components, systems, and logic may be implemented as computer-executable instructions or as data structures in memory and may be stored on, distributed across, or read from many different types of machine-readable media. The machine-readable media may include RAM, ROM, hard disks, floppy disks, CD-ROMs, flash memory or other machine-readable medium. The components, systems and logic may also be encoded in a signal, such as a signal received from a network or partitioned into sections and received in multiple packets communicated across a network.

The systems may be implemented in software, hardware, or a combination of software and hardware. The systems may be implemented in a computer programming language, such as C# or Java, or in a query language, such as the SPARQL Protocol and RDF Query Language ("SPARQL"). The systems may also use one or more metadata data models, such as the Resource Description Framework ("RDF").

Furthermore, the systems may be implemented with additional, different, or fewer components. As one example, a processor or any other logic or component may be implemented with a microprocessor, a microcontroller, a DSP, an application specific integrated circuit (ASIC), program instructions, discrete analog or digital logic, or a combination of other types of circuits or logic. As another example, memories may be DRAM, SRAM, Flash or any other type of memory. The systems may be distributed among multiple components, such as among multiple processors and memories, optionally including multiple distributed processing systems.

Logic, such as programs or circuitry, may be combined or split among multiple programs, distributed across several memories and processors, and may be implemented in or as a function library, such as a dynamic link library (DLL) or other shared library. The DLL, for example, may store code that implements functionality for a specific module as noted above. As another example, the DLL may itself provide all or some of the functionality of the system.

Interfaces between the systems and the logic and modules within systems may be implemented in numerous ways. For example, interfaces between systems may be Web Services, Simple Object Access Protocol, or Enterprise Service Bus interfaces. Other examples of interfaces include message passing, such as publish/subscribe messaging, shared memory, and remote procedure calls.

Although aspects of the invention herein have been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the invention as defined by the appended claims. Furthermore, while certain operations and functions are shown in a specific order, they may be performed in a different order unless it is expressly stated otherwise.

The invention claimed is:

1. A system for identifying a location based on a three-dimensional position of a client device, the system comprising:
a memory storage device including a three-dimensional taxonomy database, the database having a plurality of three-dimensional taxonomy records, each three-dimensional taxonomy record specifying a corresponding location, and, a selected one of the plurality of three-dimensional taxonomy records comprises:
a three-dimensional taxonomy record identifier that identifies the at least one three-dimensional taxonomy record; and,
three-dimensional geographic location information that identifies a geographic position of the location corresponding to the at least one three-dimensional taxonomy record; and
a processor operative to:
receive three-dimensional positional information from a client device that identifies a three-dimensional position of the client device;
extract elevation information from the three-dimensional positional information that identifies the elevation of the client device;
identify the selected three-dimensional taxonomy record based on mapping the elevation information of the client device to the three-dimensional geographic location information of the selected three-dimensional taxonomy record; and,
output the three-dimensional taxonomy record identifier of the selected three-dimensional taxonomy record.

2. The system of claim 1, wherein the three-dimensional geographic location information comprises global positioning system coordinates, and wherein at least one global positioning system coordinate of the global positioning system coordinates is a coordinate indicative of elevation above sea level.

3. The system of claim 2, wherein the processor is further operative to:
translate the elevation information to translated elevation information comprising an elevation value indicative of the client device's elevation above sea level; and
map the elevation information to the three-dimensional geographic location information of the selected three-dimensional taxonomy record by mapping the translated elevation information to the at least one global positioning system coordinate.

4. The system of claim 1, wherein:
the location identified by the three-dimensional taxonomy record is a first location; and
the three-dimensional geographic location information comprises relative height information that identifies the height of the location relative to a second location.

5. The system of claim 4, wherein the processor is further operative to:
translate the elevation information to translated elevation information comprising a relative elevation value indicative of the client device's elevation relative to the second location; and
map the elevation information to the three-dimensional geographic information of the selected three-dimensional taxonomy record by mapping the translated elevation information to the relative height information.

6. The system of claim 5, wherein:
the second location is a building comprising a plurality of floors;
the relative elevation value indicates that the first location is located on a selected floor of the plurality of floors;
the translated elevation information indicates that the client device is located on the selected floor of the building; and
the at least one three-dimensional taxonomy record is identified when the relative elevation value is mapped to the relative height information.

7. The system of claim 1, further comprising:
an advertising server operative to deliver a targeted advertisement, the advertising server including a keyword-advertisement database, the keyword-advertisement database having a plurality of advertisement records, wherein at least one advertisement record of the plurality of advertisement records represents the targeted advertisement; and
the advertising server being further operative to identify the at least one advertisement record based on the extracted three-dimensional taxonomy record identifier, and to deliver the targeted advertisement to the client device based on the identified at least one advertisement record.

8. The system of claim 1, further comprising:
a business search server operative to deliver a search result comprising at least one business, the business search server having a business-keyword database including a plurality of business records, wherein at least one business record of the plurality of business records represents the at least one business; and
the business search server being further operative to identify the at least one business record based on the extracted three-dimensional taxonomy record identifier, and to deliver the search result comprising the at least one business to the client device based on the identified at least one business record.

9. The system of claim 1, wherein the processor is further operative to output a data stream representative of a renderable display indicative of the location based on the extracted three-dimensional taxonomy record identifier.

10. A method for identifying a location based on a three-dimensional position of a client device, the method comprising:
establishing a three-dimensional taxonomy database, the database having a plurality of three-dimensional taxonomy records, each three-dimensional taxonomy record specifying a corresponding location, and, a selected one of the plurality of three-dimensional taxonomy records comprises:
a three-dimensional taxonomy record identifier that identifies the at least one three-dimensional taxonomy record; and,
three-dimensional geographic location information that identifies a geographic position of the location corresponding to the at least one three-dimensional taxonomy record; and
receiving three-dimensional positional information from a client device that identifies a three-dimensional position of the client device;
extracting elevation information from the three-dimensional positional information that identifies the elevation of the client device;
identifying the selected three-dimensional taxonomy record based on mapping the elevation information of the client device to the three-dimensional geographic location information of the selected three-dimensional taxonomy record; and, outputting the three-dimensional taxonomy record identifier of the selected three-dimensional taxonomy record.

11. The method of claim 10, wherein the three-dimensional geographic location information comprises global positioning system coordinates, and wherein at least one global positioning system coordinate of the global positioning system coordinates is a coordinate indicative of elevation above sea level.

12. The method of claim 11, further comprising:
translating the elevation information to translated elevation information comprising an elevation value indicative of the client device's elevation above sea level; and
mapping the elevation information to the three-dimensional geographic location information of the selected three-dimensional taxonomy record by mapping the translated elevation information to the at least one global positioning system coordinate.

13. The method of claim 10, wherein:
the location identified by the three-dimensional taxonomy record is a first location; and
the three-dimensional geographic location information comprises relative height information that identifies the height of the location relative to a second location.

14. The method of claim 13, further comprising:
translating the elevation information to translated elevation information comprising a relative elevation value indicative of the client device's elevation relative to the second location; and
mapping the elevation information to the three-dimensional geographic information of the selected three-dimensional taxonomy record by mapping the translated elevation information to the relative height information.

15. The method of claim 14, wherein:
the second location is a building comprising a plurality of floors;
the relative elevation value indicates that the first location is located on a selected floor of the plurality of floors;
the translated elevation information indicates that the client device is located on the selected floor of the building; and
the at least one three-dimensional taxonomy record is identified when the relative elevation value is mapped to the relative height information.

16. The method of claim 10, further comprising:
establishing an advertising server operative to deliver a targeted advertisement, the advertising server including a keyword-advertisement database, the keyword-advertisement database having a plurality of advertisement records, wherein at least one advertisement record of the plurality of advertisement records represents the targeted advertisement;
identifying the at least one advertisement record based on the extracted three-dimensional taxonomy record identifier; and
delivering the targeted advertisement to the client device based on the identified at least one advertisement record.

17. The method of claim 10, further comprising:
establishing a business search server operative to deliver a search result comprising at least one business, the business search server having a business-keyword database including a plurality of business records, wherein at least one of the business records of the plurality of business records represents the at least one business;
identifying the at least one business record based on the extracted three-dimensional taxonomy record identifier; and
delivering the search result comprising the at least one business to the client device based on the identified at least one business record.

18. The method of claim 10, further comprising:
outputting a data stream representative of a renderable display indicative of the location based on the extracted three-dimensional taxonomy record identifier.

* * * * *